United States Patent
Radlinski et al.

(10) Patent No.: US 9,158,846 B2
(45) Date of Patent: Oct. 13, 2015

(54) ENTITY DETECTION AND EXTRACTION FOR ENTITY CARDS

(75) Inventors: Filip Radlinski, Cambridge (GB); Nick Craswell, Seattle, WA (US); Bodo Billerbeck, Melbourne (AU); Milad Shokouhi, Cambridge (GB); Sanaz Ahari, Bellevue, WA (US); Nitin Agrawal, Redmond, WA (US); Timothy Hoad, Redmond, WA (US); Song Zhou, Redmond, WA (US); Muhammad Aatif Awan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 12/813,390

(22) Filed: Jun. 10, 2010

(65) Prior Publication Data

US 2011/0307483 A1 Dec. 15, 2011

(51) Int. Cl.
G06F 17/00 (2006.01)
G06F 17/30 (2006.01)

(52) U.S. Cl.
CPC .................. *G06F 17/30864* (2013.01)

(58) Field of Classification Search
USPC ................ 707/999.003, 1, 748, 731
See application file for complete search history.

(56) References Cited

U.S. PATENT DOCUMENTS

| | | | |
|---|---|---|---|
| 6,735,585 B1 * | 5/2004 | Black et al. | 1/1 |
| 7,096,218 B2 | 8/2006 | Schirmer | |
| 7,613,687 B2 * | 11/2009 | Nye | 1/1 |
| 7,685,201 B2 | 3/2010 | Zeng | |
| 7,698,259 B2 | 4/2010 | Xue | |
| 7,698,261 B1 | 4/2010 | Khoshnevisan | |
| 7,836,046 B2 * | 11/2010 | Sarkar et al. | 707/723 |
| 8,135,707 B2 | 3/2012 | Mika | |
| 8,533,314 B2 | 9/2013 | Tang et al. | |
| 2003/0177132 A1 | 9/2003 | Thomas et al. | |
| 2004/0049514 A1 * | 3/2004 | Burkov | 707/100 |
| 2006/0101005 A1 | 5/2006 | Yang | |
| 2006/0117003 A1 | 6/2006 | Ortega | |
| 2007/0100650 A1 | 5/2007 | Ramer et al. | |
| 2007/0233656 A1 | 10/2007 | Bunescu et al. | |

(Continued)

FOREIGN PATENT DOCUMENTS

| CN | 101454750 A | 6/2009 |
|---|---|---|
| CN | 101494617 A | 7/2009 |

OTHER PUBLICATIONS

Zhai et al., "Extracting Web Data Using Instance-Based Learning", M. Kitsuregawa et al. (Eds.): WISE 2005, LNCS 3806, pp. 318-331, 2005. Springer-Verlag Berlin Heidelberg 2005.*

(Continued)

*Primary Examiner* — Mariela Reyes
*Assistant Examiner* — Mohsen Almani
(74) *Attorney, Agent, or Firm* — Dave Ream; Jim Ross; Micky Minhas

(57) ABSTRACT

A system and method are provided for detecting entity information contained within search results. The detected entity information can be used to determine a category of entity as well as a specific entity within the search results. Entity information can be extracted from the documents associated with the search results. This information can be used as part of the information for an entity card, which can be displayed to a user in conjunction with and/or in place of the search results.

20 Claims, 5 Drawing Sheets

(56) References Cited

U.S. PATENT DOCUMENTS

| | | | |
|---|---|---|---|
| 2008/0005076 A1 | 1/2008 | Payne | |
| 2008/0065597 A1 | 3/2008 | Vedula et al. | |
| 2008/0222105 A1 | 9/2008 | Matheny | |
| 2008/0228720 A1* | 9/2008 | Mukherjee et al. | 707/3 |
| 2008/0263022 A1* | 10/2008 | Kostorizos et al. | 707/5 |
| 2009/0006338 A1 | 1/2009 | Ives | |
| 2009/0037380 A1 | 2/2009 | Jung | |
| 2009/0192983 A1 | 7/2009 | Elango | |
| 2009/0204592 A1 | 8/2009 | Zhou | |
| 2009/0327223 A1 | 12/2009 | Chakrabarti | |
| 2010/0010988 A1 | 1/2010 | Bayliss | |
| 2010/0121842 A1 | 5/2010 | Klinkott | |
| 2010/0198837 A1 | 8/2010 | Wu et al. | |

OTHER PUBLICATIONS

Arasu et al., "Extracting Structured Data from Web Pages", SIGMOD 2003, Jun. 9-12, 2003, San Diego, CA.*

Entity Search Engine: Towards Agile BestEffort Information Integration over the Web—Published Date: 2007 http://eagle.cs.uiuc.edu/wisdm/entitysearch-cidr2007-cc-jan07.pdf.

Web Question Answering: Is More Always Better?—Published Date: Aug. 2002 http://www.cs.aue.auc.dk/~legind/IR%20course%20Spring%202003/artikler/13_web-question-answering-is.pdf.

Named Entity Recognition in Query—Published Date: Jul. 23, 2009, http://research.microsoft.com/en-us/people/hangli/guo-etal-sigir2009.pdf.

General Guidelines Version 3.9—Published Dated: Jul. 16, 2009 http://montagne.andre.free.fr/General_Guidelines.txt.

PLEDS: A Personalized Entity Detection System Based on Web Log Mining Techniques—Published Date: Jul. 22, 2008. ftp://ftp.fas.sfu.ca/pub/cs/TR/2008/CMPT2008-06,pdf.

FOA dated Apr. 26, 2012 for U.S. Appl. No. 12/813,376, 24 pages.

OA dated Nov. 7, 2011 for U.S. Appl. No. 12/813,376, 15 pages.

OA dated Apr. 30, 2013, for U.S. Appl. No. 12/813,376, 16 pages.

Liu, et al., "XWRAP: An XML-enables Wrapper Construction System for Web Information Sources", Data Engineering, 2000.

Chang, et al., "A Survey of Web Information Extraction Systems", IEEE Transactions on Knowledge and Data Engineering, vol. 18, No. 10, Oct. 2006.

Non-Final Office Action dated Jun. 4, 2014 regarding U.S. Appl. No. 12/813,376 20 pages.

Final Office Action dated Nov. 18, 2013 in U.S. Appl. No. 12/813,376, 19 pages.

Final Office Action dated Oct. 16, 2014 in U.S. Appl. No. 12/813,376, 25 pages.

Chinese Office Action dated Jun. 3, 2015 with Search Report dated May 20, 2015 in Application No. 201110165766.1, 16 pages.

Chinese Office Action dated Aug. 7, 2015 with Search Report dated Aug. 1, 2015 in Application No. 201110164789.0, 19 pages.

* cited by examiner

ENTITY DETECTION AND EXTRACTION FOR ENTITY CARDS

BACKGROUND

Search engines are used to locate a variety of types of information. While returning lists of links to relevant documents is now a familiar format, it is not necessarily a convenient format. In order to find a particular piece of information, the user typically must click through a link to review the corresponding document. The user may have to repeat this process multiple times if the desired information is not located in the first document accessed by the user.

SUMMARY

In various embodiments, a system and method are provided for detecting entity information contained within search results. The detected entity information can be used to determine a category of entity as well as a specific entity within the search results. Entity information can be extracted from the documents associated with the search results. This information can be used as part of the information for an entity card, which can be displayed to a user in conjunction with and/or in place of the search results.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
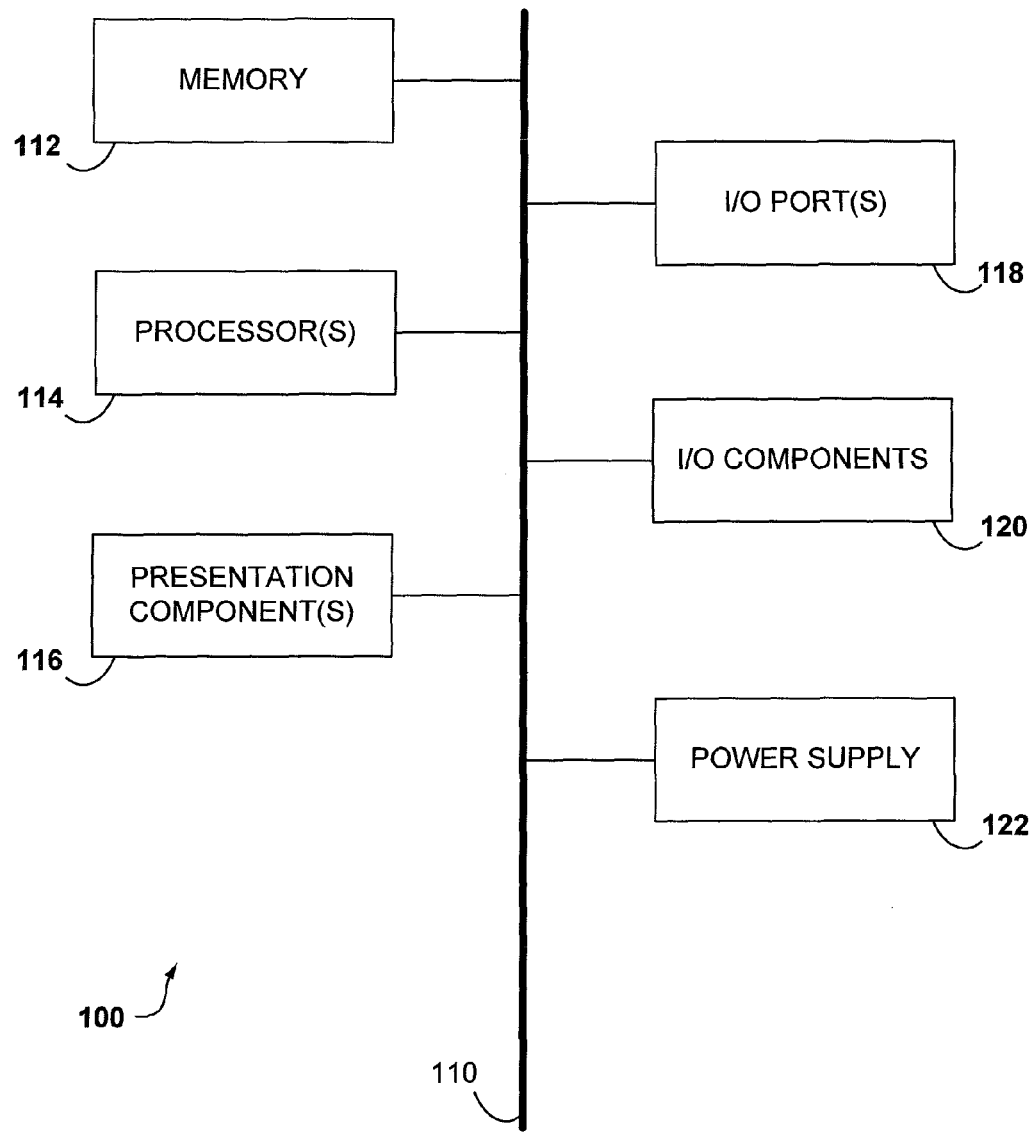
FIG. 1 is a block diagram of an exemplary computing environment suitable for use in implementing embodiments of the present invention.

In various embodiments, when a search query is received, a plurality of search results can be generated by a search engine. The results generated by the search engine can then be analyzed to identify whether an entity category is indicated by the results. This identification can be based in part on identification of one or more category-oriented sites in the results. The results can be further analyzed to determine an intended entity. Based on the intended entity, an entity card corresponding to the entity can be prepared and displayed with the search results. Optionally, one or more of the generated search results can be excluded from display or incorporated into the entity card based on the intended entity.

In the discussion below, an entity card refers to an enhanced entity-specific presentation of information. An entity card can include a variety of types of information about an entity. An entity card can allow such information to be presented to a user in response to a search query, so that a user does not have to sift through document links to obtain the information.

Category Templates

Determining a user's intent associated with a search query can pose a variety of problems. One method for identifying a user's intent can be to determine if the search query is related to an entity. An entity can refer to a type of person such as an author, politician, or sports player; a type of product such as a movie, book, or a consumer good; or a type of place such as a restaurant, hotel, recreation area, or retail store. However, identifying an entity related to a search query also creates difficulties. Many conventional methods attempt to build lists of entities that can be matched to terms in a search query. Keeping such lists up to date can be difficult and time consuming. Additionally, the entity related to a search query may not be included in the search terms.

In various embodiments, entity information can be determined dynamically based on the search results responsive to a search query. Entities can be identified based in part on identifying search results from documents that are known to correspond to a particular category. Numerous web sites exist that attempt to track the current status of a variety of entities. For example, multiple web locations are available that track movies, hotels, consumer electronics, or books. These sites can be referred to as category-oriented sites. Category-oriented sites typically track current developments within the specific category of interest, and therefore can provide current information about entities within the category. The number and/or identity of category-oriented sites typically changes slowly over time, so identifying appropriate sites as being related to a category can be a manageable task. A document associated with a uniform resource locator (URL) from one of these sites can have an increased likelihood of association with a category.

For documents from category-oriented sites, one or more category templates can be constructed. The structure of a document at a category-oriented site is usually consistent between entities described on the site. This consistency of presentation can be used to construct a template for extracting information from the site. For example, a category-oriented site that provides information about movies will typically have a consistent presentation format. The director of a movie will be noted in a certain way, such as at a certain place in a document or with the heading "Director" adjacent to and/or above the director's name. This expected presentation format can be used to construct a template for extracting the information from the document. Note that a site could be considered as a category-oriented site for more than one category. For example, an online retailer may carry products that include consumer electronics, DVDs, and computer games. The online retailer can have one or more URL components that correspond to each of these areas. Thus, depending on the search query, the appearance of a document from the online retailer could correspond to a movie category, a game category, or a consumer goods category.

A template can be constructed for each category-oriented site. A template can include at least two components. One part of a template can be a URL component. The URL component represents an initial portion of a URL. A document that matches the initial portion of a URL template can be a document from a known category-oriented site. The second component of a template can be an extraction format component. The extraction format component provides a specification for a plurality of data fields, including the type of information the can be extracted for each data field, as well as a specification of how to extract the information. Any convenient type of specification can be used. For example, the specification can identify a specific location in a document to retrieve a piece of information, such as taking a value from the second field in the fifth line of a document. Alternatively, a specification can be tag driven, such as specifying to first identify a header such as "title" or "movie title", and then taking the information or word that appears in a certain relation to the header.

In addition to the category templates based on the category-oriented sites, one or more category templates that have an open format can be constructed for a category. The open format category templates can be constructed to extract the same information as the templates for the category-oriented sites. The open format templates can be similar to the tag driven templates for a category-oriented site, as the open format templates will be applied to pages that do not match a URL component.

Note that each open format template can be applied to each responsive result, or to each responsive result that is identified as corresponding to an identified entity. This can lead to extraction of multiple values for each data field from the same document. To make this data more useful for each document, a consistency check can be performed to determine which open format template was successful in extracting data for a given data field. For example, for a given document, the multiple values for each field can be compared to the values extracted from a document from a category-oriented site. Since the likelihood of an accidental match is low, a matching value is likely to be the correctly extracted value. Another type of check can be a consistency check versus the values extracted using open format templates from other documents. Again, the likelihood of an accidental match is low, so a match likely indicates a successful extraction for the field.

Category-oriented sites can be determined by any convenient method. The category-oriented sites can be identified manually. Alternatively, the category-oriented sites can be determined by submitting known searches that should return category specific results. The sites that appear most frequently can be considered as category-oriented sites.

Category and Entity Identification

When a search query is received, a conventional search engine can be used to generate a plurality of responsive results or documents. In the embodiments below, a portion of the responsive documents can be analyzed to determine category or entity information. This can correspond to the top 10 responsive results, or the top 20, or the top 50, or any other convenient number. The responsive documents can be analyzed to determine an entity category. One part of the analysis can be to match documents to the URL component of the category templates. In an embodiment, at least one URL component match can be required in order to make an identification of an entity category. Another part of the analysis can be to match metadata from a search result with known terms. For example, metadata terms such as "movie", "trailer", or "film" could be associated with a movie site. The metadata can correspond to metatags for the document, or the caption of the document that is displayed as part of the search results, or any other information associated with the document that is available when the document is returned as a search result.

Matches to either the category template or the metadata can then be weighted to determine a score for whether a search query corresponds to a category. For example, each document that matches a URL component can contribute to a score for that category. Additional weight or score can be assigned for the first document that matches a URL component. Additional weight or score can be assigned for a higher ranked search result that matches a URL component versus a lower ranked search result. Similar types of weightings can be used for metadata analysis.

Based on the scores, an intended category for the search can be determined. For example, if three or more URL component matches are detected for a single category, the query can be assigned to that category. If multiple categories are detected based on matching the URL components, the highest ranked category can be assigned. In some embodiments, if no URL component matches are detected, there may be no selection of a category. Alternatively, no selection of a category can occur if there are one or fewer URL component matches.

The results can also be analyzed to determine if an entity is associated with the search query. In an embodiment, the category can be identified first and then the results can be analyzed to determine an entity. In such an embodiment, only entities that belong to the identified category are considered. In another embodiment, if an entity category is not detected, no entity is associated with the search query.

One part of entity analysis can be to apply a category template to a document from a category-oriented site. Because the document is from a category-oriented site, the extraction format of the document is likely to be known. Thus, the portion of the document that is likely to correspond to an entity is also likely to be known, and the entity can be directly extracted. Another part of entity analysis can be to apply one or more of the open format category templates to documents in the responsive results that are not from category-oriented sites. For example, many restaurant review sites list the name of the restaurant together with the address. An open format template could attempt to extract a restaurant name from an unknown document format by finding a group of text that corresponds to an address. The name immediately before the address could then be extracted as a possible entity. In embodiments where the category is not determined prior to analyzing an open format document to detect an entity, the open format templates used can correspond to the categories of any category-oriented sites in the search results.

The entity data extracted from the documents can then be analyzed to determine whether an entity associated with the search query can be identified. The analysis can compare the extracted information to determine if there is only one possible entity, or if one entity can be selected from several, or whether there is ambiguity that prevents determination of an entity.

Some entity determinations can be relatively straightforward. For example, the category selection may have been based on the presence of multiple category-oriented sites, with each of the category-oriented site documents indicating the same entity. In this situation, the entity from the category-oriented site documents can be selected as the entity.

In another example, one or more documents may be from category-oriented sites, but the extraction of entity information results multiple potential entities. This can be resolved in a variety of manners. One option can be to select the entity appearing in the largest number of category-oriented documents. Another option can be to select the entity extracted from the largest number of documents, regardless of the source. This option would include entities identified based on open format templates. Still another option can be to select an entity based in part on the ranking of the documents that each entity was extracted from. Still other options can be used based on giving various weights to the data extracted from documents, including combinations of any of the above options.

Yet another example can involve a situation where two or more categories are indicated by the search results. In some embodiments, the category can be determined first, and then only entities within the selected category are considered. In another option, each document can be analyzed according to each potential category. The methods for distinguishing between multiple entities as described above can then be used to select an entity. This would result in the corresponding selection of a category. Note that in this type of embodiment, the category weights could be included as another factor in deciding which entity is the best match for the search query.

Still another option can involve a situation where more than one piece of information is needed to differentiate between entities. For example, many restaurants are local businesses with only one location. As a result, more than one city may have a restaurant with the same name, even though the restaurants are different entities. The multiple restaurant entities with the same name can be referred to as entities that have the same primary identification.

The above situation can result in multiple restaurant review sites that have reviews based on a restaurant with the same primary identification, but each review is directed to a different restaurant entity. In this situation, the presence of several URL component matches and other metadata could clearly indicate a restaurant category, but a further determination may be needed to select an entity that corresponds to the search query. One option can be to look at additional extracted data fields for the category. In a restaurant example, typical additional information for extraction could include address and telephone number information. These fields can be compared to identify distinct restaurant entities that share the same name. This can be referred to as comparing secondary information for the various entities. After distinguishing between the entities based on the secondary information, the results corresponding to each distinct entity can be sorted into groups corresponding to each distinct entity. The methods noted above can be applied to determine an entity associated with the search query, such as selecting the entity that occurs most often, selecting the entity with the highest rated document, or other methods.

In some embodiments, the entity analysis can result in no entity being associated with a query. For example, if no category is assigned due to a lack of URL component matches, the entity analysis process can be stopped at that point. As another option, a scoring system can be used to determine the entity, and no entity may have a sufficiently high score and/or a sufficiently different score from other potential entities for an assignment to be made. In the restaurant example above, each restaurant may appear in only one document. The scoring system could require an appearance in more than one document to achieve a sufficient score for assignment as an entity. Alternatively, two restaurants may appear in a comparable number of documents, leading to both restaurants having similar scores. Because the scores are not sufficiently different, no entity may be assigned to the search query.

In still other embodiments, multiple entities can be selected. In such embodiments, more than one entity can satisfy a criteria for being selected as an entity. For example, all identified entities can be selected, or entities with a score greater than a threshold value can be selected. In such embodiments, entity information can be extracted for each selected entity. The plurality of selected entities can be from a single category, or multiple entity categories can be identified as well. For example, an entity corresponding to a book and an entity corresponding to a movie can be selected. Optionally, an entity card can be displayed for each selected entity.

Entity Card Extraction

After identifying an entity, information regarding the entity can be extracted from the documents returned as search results. The extracted information can be used to generate an entity card. The entity card allows information regarding the intended entity to be displayed as part of the results page, without further clicks or other actions by a user to find the information.

In embodiments where at least one of the search results corresponds to a category-oriented site, the appropriate category template can be used to extract information for an entity card. The types of extracted information can vary based on the category. Examples of information that can be extracted include location information, contact information, and other information commonly requested for a given entity type. For example, an entity card for a movie could include the length of the film, the name of the director, and whether the film is a comedy, drama, or another type of movie. A restaurant entity card could include the type of food and a general indication of the price range. An entity card about a sports team could include the next scheduled game and the result of the prior game.

Another type of information that can be included in the entity card is one or more links to other types of relevant content. In some embodiments, the additional information presented in an entity card can correspond to information related to a secondary intent of the search query. For example, a search query related to a movie currently playing in theaters is likely to provide results such as movie reviews and theater locations. A movie no longer in theaters will instead likely have results related to stores where a copy of the movie can be purchased. This difference in the types of search results can represent a difference in the secondary intent of the search query. This secondary intent information can be used to include links relevant to the secondary intent as part of an entity card. The links included in the entity card may or may not correspond to a links that are part of the results from the search engine. The nature of the additional links can vary depending on the entity. For a restaurant, a link could be provided to an online site that handles reservations. For a sports or entertainment entity, such as a movie or a band, a link can be provided to a site that has tickets available. Links could also be provided to one or more third party review sites that are known to handle reviews for the category.

One of the advantages of forming an entity card based on the search results is that the information can be dynamically generated. Thus, any changes in the information reflected in the search results are automatically updated in the entity card as well. However, dynamically constructed entity cards can be used in conjunction with static entity cards containing previously obtained information. Use of previously obtained information can be helpful in situations where desired information cannot be extracted from the search results.

In still another embodiment, an entity can be identified and an entity card including stored information can be provided. In such an embodiment, the methods of entity identification described above can be used to identify and select an entity. Stored information corresponding to the selected entity can then be used to form the entity card.

Placement of Information Based on Entity Detection

The intent of a search query in relation to an entity can be used to modify the placement and/or display of results and associated information. After determining an intended entity for a search query, the results can be reviewed to identify any results that are related to the entity. These can include results that correspond to a category-oriented site, results that include the name of the identified entity, or results where additional information regarding the identified entity was successfully extracted.

Identification of an entity can modify placement of information in a variety of ways. In an embodiment, identification of an entity can lead to selection of advertising related to the entity. The selected advertising can be placed on the page in a location near a search result corresponding to the entity. For example, if the highest ranked search results corresponding to the identified entity are results seven through nine, the advertisement can be placed near the bottom of a page showing the first ten search results. Similarly, if an entity card is generated, the entity card can be placed on the page in the vicinity of the highest ranked search result related to the entity, or near the second highest ranked result related to the entity.

Another impact of entity detection can be to remove some items from the display of search results. For example, one or more documents from the search results may be incorporated into an entity card. These results can optionally be removed from the displayed list of search results, as access to these documents is available instead via the entity card. Another way to modify the result display can be to display a portion of the responsive results, such as only the responsive results that are related to either the entity or the category of the entity. In such an embodiment, once an assignment is made of a category and entity, results that do not match the category and/or the entity can be omitted from the results display. Instead, an object can be displayed that allows the user to access the excluded results after an additional user action. For example, a link can be provided to indicate more results are available not related to the identified entity. This link can be accessed by a click through by the user or by moving a pointer or cursor over the location of the link. Alternatively, a drop down menu could be provided with the additional results.

Examples of Entity Detection

In this hypothetical example, a user initially types the search term "godfather" into a search engine. The results generated by this search include a plurality of results from at least one category-oriented site related to movies. Additional category-oriented sites related to retail sales and/or video games are also in the search results. Since a category-oriented site is the highest ranked search result, the category selection is made based on the highest ranking category-oriented site. As a result, the category "movies" is selected.

After selecting the category, the category-oriented sites are used to detect the entity. This results in detection of multiple entities, as both the movie "Godfather" and the movie "Godfather II" are included in the search results. The movie "Godfather" is selected as the appropriate entity, based on the fact that "Godfather" was detected in more of the responsive results than "Godfather II". The responsive results are then presented to the user, along with an entity card corresponding to the movie. The entity card is formed based on extracting information from the documents listed in the responsive results.

After viewing the presented results, the user modifies the search terms to "godfather restaurant". A new set of search results is generated. In the new results, the top rated corresponds to a general review site that can be category-oriented, but for many categories. Many additional potential category-oriented sites are included within the top 20 results, corresponding to other known review sites. Based on metatags from the review site documents, a category of "restaurants" is selected.

Based on this category selection, the appropriate category templates can be selected to analyze both the category-oriented review sites. Open format category templates can also be used to analyze the other document. The search results include several distinct restaurants located around the U.S., as well as a chain of pizza restaurants. However, the only repeat appearance of location data is for a location in San Diego, Calif. The documents listing the San Diego, Calif. address are grouped together, and this entity is selected as the entity corresponding to the search query. Note that if each instance of the restaurant had appeared only once, in some embodiments no entity would have been identified as the intent would not be clear. Additional information can then be extracted regarding the entity from the responsive results that correspond to the entity.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In an embodiment, the computer-readable media can be tangible computer-readable media. In another embodiment, the computer-readable media can be non-transitory computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
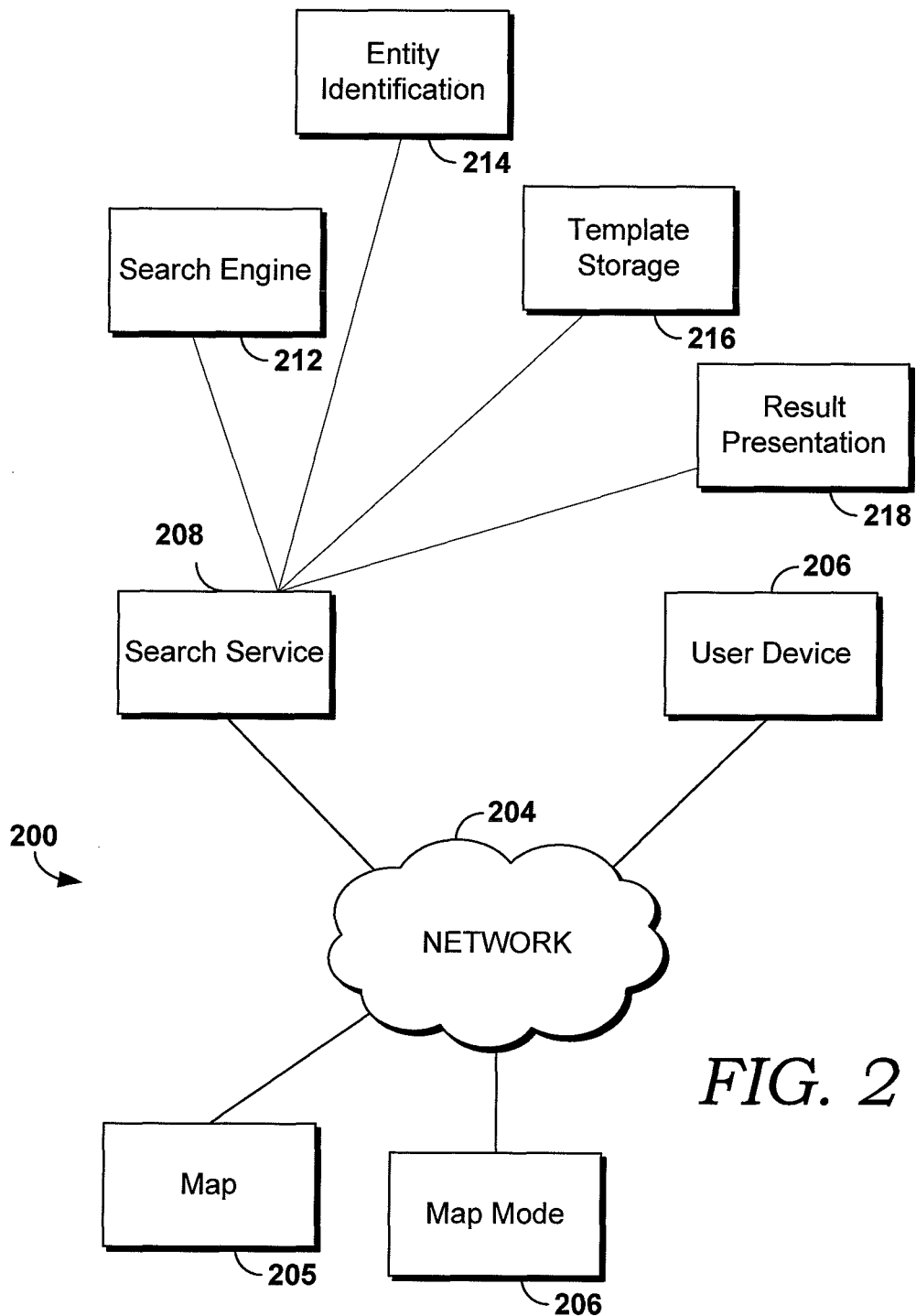
FIG. 2 schematically shows an example of a system suitable for performing an embodiment of the invention.

Turning now to FIG. 2, a block diagram is illustrated, in accordance with an embodiment of the present invention, showing an exemplary computing system 200. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206 and a search service 208 in communication with one another via a network 204. The search service 208 can include a search engine 212, entity identification component 214, template storage 216, and result presentation component 218. Search engine 212 can be a conventional search engine for generating responsive results based on a search query. Entity identification component 214 can analyze search results to determine a category and an entity that corresponds to a search query. This analysis can be performed in part by using the category templates stored in template storage 216. Result presentation component 218 can use the entity information provided by entity identification component 214 to modify the display of responsive results. Based on an identified entity, advertising based on identification of the entity can be included at a location that corresponds to a result about the identified entity. An entity card can also be presented based on the identified entity.

Figure 3:
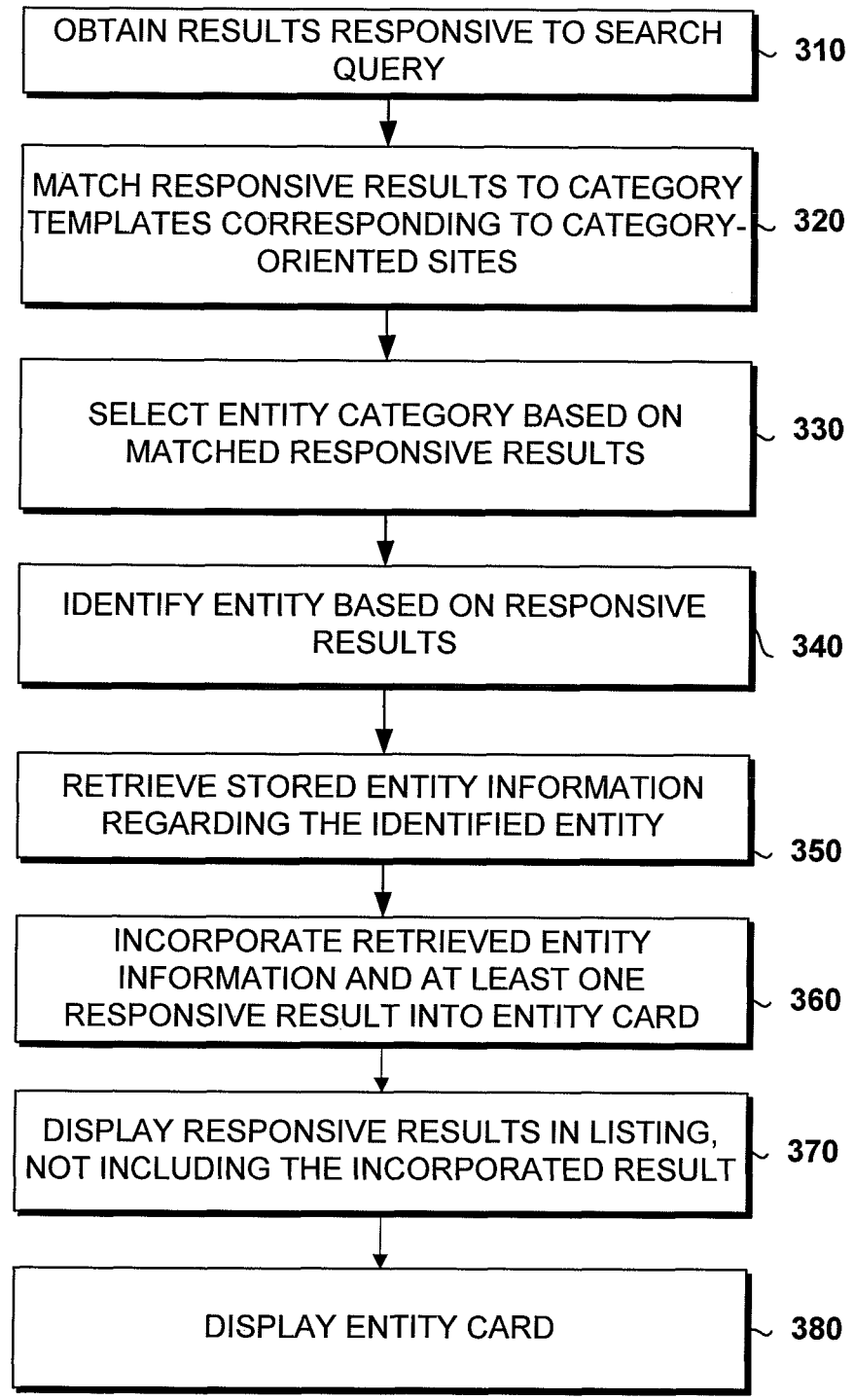
FIG. 3 depicts a flow chart of a method according to an embodiment of the invention.

FIG. 3 depicts a flow chart showing a method according to an embodiment of the invention. In the embodiment shown in FIG. 3, a plurality of results are obtained 310 that are responsive to a search query. The results can be obtained from a remote search engine, or the results can be based on receiving a search query and generating a set of responsive results. One or more responsive results are matched 320 to category templates that correspond to one or more category-oriented sites. In various embodiments, the responsive results can all match one category template, or the results can match various category templates from a single entity category, or the results can match category templates from multiple entity categories. An entity category is selected 330 based on the one or more matched responsive results. An entity is also identified 340 based on the responsive results. In various embodiments, the entity can be identified 340 after selecting 330 the entity category. Stored entity information corresponding to the identified entity is then retrieved 350. The retrieved entity information is incorporated 360 into an entity card along with at least one responsive result. A responsive results listing is displayed 370 that does not include the incorporated responsive result. The entity card is also displayed 380. Note that in this embodiment, the incorporated responsive result is excluded from the listing of responsive results based on incorporation into the displayed entity card.

Figure 4:
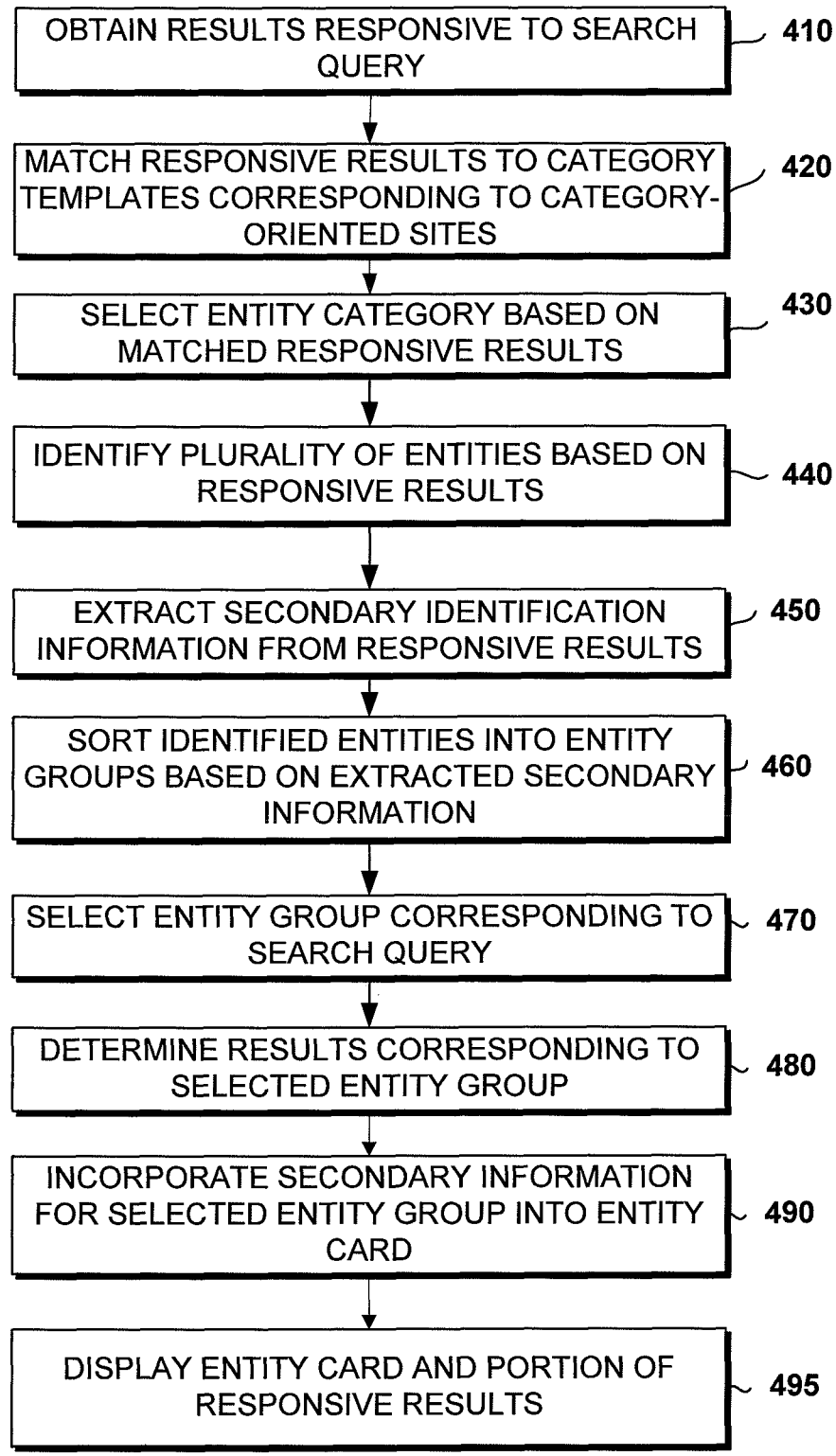
FIG. 4 depicts a flow chart of a method according to an embodiment of the invention.

FIG. 4 depicts a flow chart showing a method according to an embodiment of the invention. In the embodiment shown in FIG. 4, a plurality of results are obtained 410 that are responsive to a search query. The results can be obtained from a remote search engine, or the results can be based on receiving a search query and generating a set of responsive results. One or more responsive results are matched 420 to category templates that correspond to one or more category-oriented sites. In various embodiments, the responsive results can all match one category template, or the results can match various category templates from a single entity category, or the results can match category templates from multiple entity categories. An entity category is selected 430 based on the one or more matched responsive results. A plurality of entities is identified 440 based on the responsive results. In various embodiments, the plurality of entities can be identified 440 after selecting 430 the entity category. The plurality of entities each have the same primary identification. Secondary information is extracted 450 from the responsive results for each of the plurality of entities. The identified entities are sorted 460 into entity groups based on the extracted secondary information. This sorting can allow identified entities that are the same entity to be grouped together, with each distinct entity having a separate group. An entity group can then be selected 470 that corresponds to the search query. For the selected entity group, the responsive results corresponding to the entity group can be determined. The secondary information for the selected entity group is incorporated 490 into an entity card. The entity card and a portion of the responsive results are displayed 495. The portion of the responsive results can exclude the responsive results determined as corresponding to the entity group.

Figure 5:
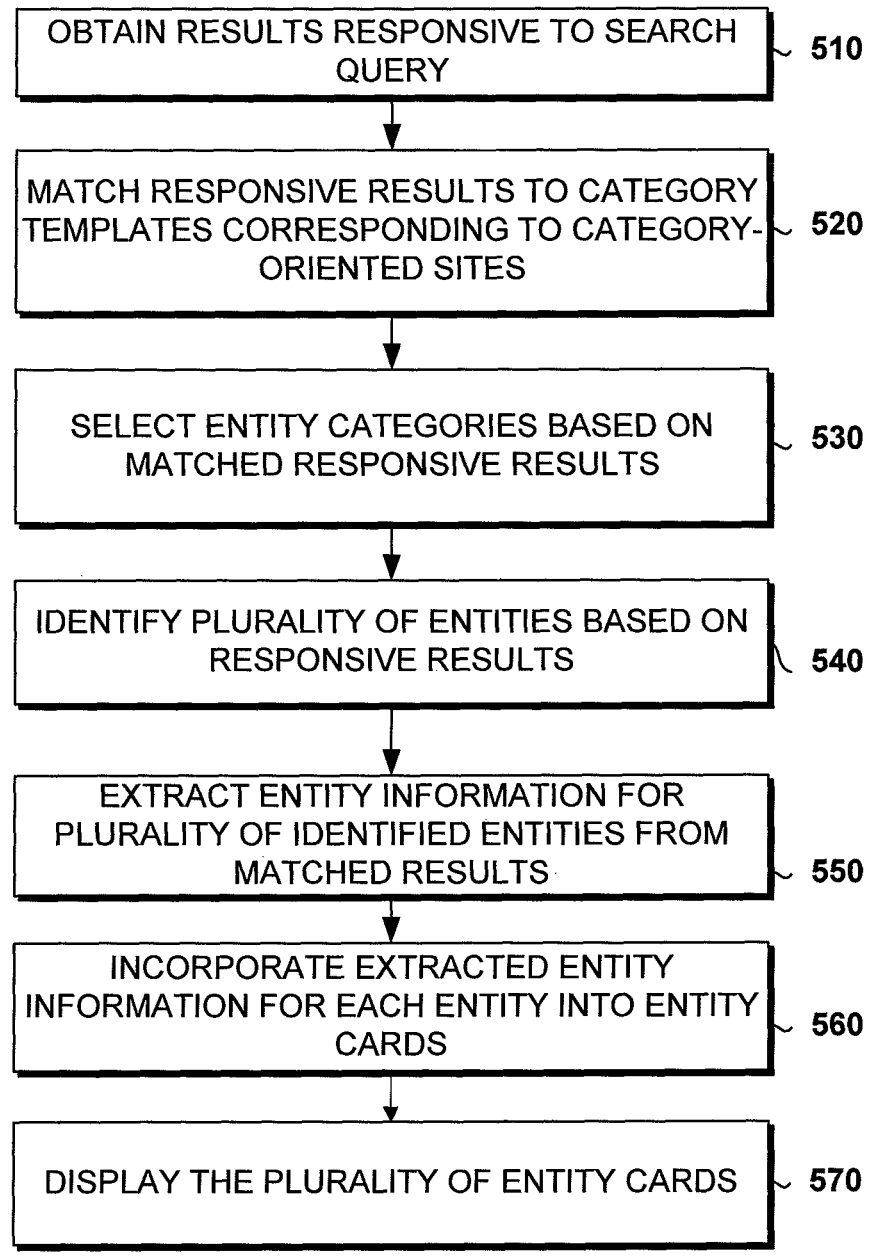
FIG. 5 depicts a flow chart of a method according to an embodiment of the invention.

FIG. 5 depicts a flow chart showing a method according to an embodiment of the invention. In the embodiment shown in FIG. 5, a plurality of results are obtained 510 that are responsive to a search query. The results can be obtained from a remote search engine, or the results can be based on receiving a search query and generating a set of responsive results. One or more responsive results are matched 520 to category templates that correspond to one or more category-oriented sites. In various embodiments, the responsive results can all match one category template, or the results can match various category templates from a single entity category, or the results can match category templates from multiple entity categories. An entity category is selected 530 based on the one or more matched responsive results. An entity is also identified 540 based on the responsive results. In various embodiments, the entity can be identified 540 after selecting 530 the entity category. Entity information can then be extracted 550 from the responsive results. The extracted entity information for each of the entities can be incorporated 560 into entity cards. The plurality of entity cards can be displayed 570.

Additional Embodiments

In an embodiment, one or more computer-storage media storing computer-useable instructions are provided that, when executed by a computing device, perform a method for determining an entity associated with a search query. The method includes obtaining a plurality of results responsive to a search query. A plurality of responsive results are matched to a plurality of category templates corresponding to category-oriented sites. An entity category is selected based on the plurality of matched responsive results. An entity is identified based on the plurality of matched responsive results. Stored entity information is retrieved regarding the identified entity. The retrieved entity information and at least one responsive result is incorporated into an entity card. The responsive results are displayed in a search result listing, the listing not including the at least one incorporated responsive result. The entity card is also displayed.

In another embodiment, one or more computer-storage media storing computer-useable instructions are provided that, when executed by a computing device, perform a method for determining an entity associated with a search query. The method includes obtaining a plurality of results responsive to a search query. One or more responsive results are matched to at least one category template corresponding to a category-oriented site. An entity category is selected based on the one or more matched responsive results. A plurality of entities is identified corresponding to the selected entity category in the plurality of responsive results, each identified entity having the same primary identification. Secondary identification information is extracted corresponding to each identified entity from the plurality of responsive results. The identified entities are sorted into one or more entity groups based on the extracted secondary identification information. An entity group is selected as corresponding to the search query. One or more responsive results are determined corresponding to the selected entity group. The extracted secondary identification information for the selected entity group is incorporated into an entity card. The entity card and a portion of the responsive results are displayed, the portion of the responsive results excluding the determined one or more responsive results corresponding to the entity of the selected entity group In still another embodiment, a method for determining an entity associated with a search query is provided. The method includes, obtaining a plurality of results responsive to a search query. One or more responsive results are matched to at least one category template corresponding to a category-oriented site. One or more entity categories are selected based on the one or more matched responsive results. A plurality of entities are identified based on the plurality of responsive results. Entity information is extracted corresponding to the plurality of identified entities from the plurality of responsive results. The extracted entity information for each of the plurality of identified entities is incorporated into a plurality of entity cards. The plurality of entity cards is displayed.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

What is claimed is:

1. A system for determining an entity associated with a search query, the system comprising:
   one or more processors; and
   one or more computer-storage media storing computer-useable instructions that, when executed by the one or more processors, cause the one or more processors to perform a method comprising:
   obtaining a plurality of results responsive to a search query;
   matching responsive results of the plurality of results to a plurality of category templates corresponding to category-oriented sites, a category template comprising a presentation format for a corresponding category-oriented site, a category-oriented site being defined as a site that tracks a status of a plurality of entities in an entity category;
   assigning an entity category, selected from a plurality of entity categories, to the search query based on the responsive results matching the plurality of category templates, the assigning comprising generating category scores for the plurality of entity categories based on an amount of the responsive results that match a particular one of the plurality of category templates, the entity category being assigned based on having the highest category score of the plurality of entity categories;
   identifying an entity based on the entity belonging to the assigned entity category and at least one or more data fields extracted from the matched responsive results, the one or more data fields being extracted using extraction format components of the plurality of category templates, the one or more data fields being different from a URL component;
   retrieving stored entity information regarding the identified entity;
   incorporating the retrieved entity information and at least one responsive result into an entity card;
   displaying the responsive results in a search result listing, the search result listing not including the at least one incorporated responsive result; and
   displaying the entity card.

2. The system of claim 1, wherein in the assigning the entity category additional weight is given to a category score based on the amount of the responsive results that match the particular one of the plurality of category templates.

3. The system of claim 1, wherein the matching comprises matching a portion of a uniform resource locator (URL) for a document of the responsive results with a URL component of a category template of the plurality of category templates.

4. The system of claim 1, the method further comprising supplementing the stored entity information with additional entity information extracted from the responsive results.

5. The system of claim 2, wherein the plurality of entity categories comprise a movie category, a game category, a restaurant category, and a consumer goods category.

6. The system of claim 1, wherein identifying the entity comprises:

generating an entity score for each one of a plurality of entities based on at least the one or more data fields extracted from the responsive results; and identifying the entity having a highest entity score.

7. One or more computer-storage media hardware devices storing computer-useable instructions that, when executed by a computing device, perform a method for determining an entity associated with a search query, comprising:

obtaining a plurality of results responsive to a search query;

matching one or more responsive results of the plurality of results to at least one category template corresponding to a category-oriented site, a category-oriented site being defined as a site that tracks a status of a plurality of entities in an entity category;

assigning an entity category to the search query based on the one or more responsive results matching the at least one category template, the assigning comprising generating category scores for a plurality of entity categories based on an amount of the one or more responsive results that match a particular one of the plurality of category templates, the entity category being assigned based on having the highest category score of the plurality of entity categories;

identifying a plurality of entities corresponding to the assigned entity category in the plurality of responsive results, each identified entity identified based on belonging to the entity category;

extracting secondary identification information corresponding to each identified entity from the plurality of responsive results;

sorting the identified plurality of entities into a plurality of entity groups based on the extracted secondary identification information;

selecting an entity group as corresponding to the search query;

determining one or more responsive results corresponding to the selected entity group;

incorporating the extracted secondary identification information for the selected entity group into an entity card; and displaying the entity card and a portion of the responsive results, the portion of the responsive results excluding the determined one or more responsive results corresponding to the entity of the selected entity group.

8. The one or more computer-storage media hardware devices of claim 7, wherein determining one or more responsive results corresponding to the entity of the selected entity group comprises identifying responsive results from which secondary identification information for the selected entity group was extracted.

9. The one or more computer-storage media hardware devices of claim 7, wherein matching one or more responsive results to at least one category template corresponding to category-oriented sites comprises matching a portion of a uniform resource locator (URL) for a document of the responsive results with a URL component of a category template.

10. The one or more computer-storage media hardware devices of claim 7, further comprising:

identifying, for the selected entity group, at least one secondary identification information field extracted from the responsive results that have conflicting extracted values;

assigning a stored value to the information field having the conflicting extracted values in the extracted entity information.

11. The one or more computer-storage media hardware devices of claim 7, wherein selecting an entity group comprises selecting an entity group containing extracted secondary information from a highest number of responsive results.

12. The one or more computer-storage media hardware devices of claim 7, wherein selecting an entity group comprises selecting an entity group containing extracted secondary information from at least a plurality of documents.

13. The one or more computer-storage media hardware devices of claim 7, wherein extracting secondary information from the one or more responsive results comprises extracting data fields from one or more documents based on an open form category template.

14. A method for determining an entity associated with a search query, comprising:

obtaining results responsive to a search query;

matching documents from the results to at least one category template corresponding to a category-oriented site, the at least one category template comprising a presentation format for the corresponding category-oriented site, a category-oriented site being defined as a site that tracks a status of a plurality of entities in an entity category;

generating category scores for a plurality of entity categories based on the results, wherein additional weight is given to a category score based on an amount of a plurality of the documents that match the at least one category template;

assigning one or more entity categories of the plurality of entity categories to the search query based on the category scores;

identifying a plurality of entities based on at least the assigned one or more entity categories and at least one or more data fields extracted from the one or more matched documents, the one or more data fields being extracted using extraction format components of the at least one category template, the one or more data fields being different from a URL component;

extracting entity information corresponding to the plurality of identified entities from the plurality of responsive results;

incorporating the extracted entity information for each of the plurality of identified entities into a plurality of entity cards based on the search query; and displaying the plurality of entity cards.

15. The method of claim 14, further comprising excluding from display at least one non-matched responsive result.

16. The method of claim 15, wherein excluding from display the at least one non-matched responsive result comprises providing a condensed representation for the at least one non-matched responsive result, the condensed representation requiring at least one additional user action to display the at least one non-matched responsive result.

17. The method of claim 16, wherein the at least one additional user action required to display the at least one non-matched responsive result comprises clicking on a displayed object.

18. The method of claim 16, wherein the at least one additional user action required to display the at least one non-matched responsive result comprises selecting the non-matched responsive result from a drop-down menu.

19. The method of claim 14, wherein extracting information from the one or more matched documents comprises extracting data fields from the one or more matched documents based on an open form category template.

20. The method of claim 14, wherein the plurality of identified entities are from the same entity category.

* * * * *